United States Patent [19]

Edwards et al.

[11] Patent Number: 5,616,310
[45] Date of Patent: Apr. 1, 1997

[54] ALUMINOSILICATES

[75] Inventors: Richard B. Edwards; Peter Graham, both of Wirral, Great Britain

[73] Assignee: Crosfield Limited, Warrington, United Kingdom

[21] Appl. No.: 637,768

[22] PCT Filed: Oct. 13, 1994

[86] PCT No.: PCT/EP94/03390

§ 371 Date: Jul. 9, 1996

§ 102(e) Date: Jul. 9, 1996

[87] PCT Pub. No.: WO95/12546

PCT Pub. Date: May 11, 1995

[30] Foreign Application Priority Data

Nov. 2, 1993 [GB] United Kingdom .................. 9322529

[51] Int. Cl.$^6$ .................................................. C01B 39/02
[52] U.S. Cl. ................................... 423/700; 423/328.2
[58] Field of Search .................................. 423/700, 328.2

[56] References Cited

U.S. PATENT DOCUMENTS

| | | | |
|---|---|---|---|
| 4,289,740 | 9/1981 | Estes | 423/700 |
| 4,314,979 | 2/1982 | Deabriges | 423/700 |
| 4,649,036 | 3/1987 | Pastorello et al. | 423/700 |
| 5,326,466 | 11/1994 | Araya et al. | 423/328.1 |
| 5,374,370 | 12/1994 | Brown et al. | 252/174.25 |

FOREIGN PATENT DOCUMENTS

| | | |
|---|---|---|
| 384070 | 8/1990 | European Pat. Off. . |
| 565364 | 10/1993 | European Pat. Off. . |
| 2256720 | 11/1987 | Japan ..................... 423/700 |

*Primary Examiner*—Mark L. Bell
*Assistant Examiner*—David Sample
*Attorney, Agent, or Firm*—Cushman Darby & Cushman IP Group Pillsbury Madison & Sutro LLP

[57] ABSTRACT

Process for manufacturing an alkali metal aluminosilicate of zeolite P type, wherein sodium silicate solution, sodium aluminate solution and sodium hydroxide are mixed together in a first reacting zone, the mixture reacting to form amorphous aluminosilicate and supersaturated mother liquor and being then transferred from this first reacting zone to a second reacting zone, the transferred mixure having a degree of crystallinity below 30%, preferably 20%, the mixture being afterwards allowed to fully convert into P type zeolite, the resulting product being eventually filtered, washed and dried.

4 Claims, No Drawings

ALUMINOSILICATES

This application claims benefit of international application PCT/EP94/03390, filed Oct. 13, 1994.

FIELD OF THE INVENTION

The invention describes the preparation of alkali metal aluminosilicates, in particular crystalline aluminosilicates having the P-structure. These materials are of value as a component in detergent formulations in which they remove calcium and magnesium hardness ions by ion exchange. They also have other properties which provide additional benefits when used in detergent formulations. These aluminosilicates will be referred to as zeolite P in this description.

BACKGROUND OF THE INVENTION

While the utility of zeolite P in detergent formulations has been acknowledged, for example in European Patent Application 0384070 (Unilever), they must be manufactured by a commercially effective process in order to become available on the market place. Thus, while the properties of a material may make it a useful commercial commodity, its manufacture has to be optimised for large scale production.

The zeolite P class includes a series of synthetic zeolite phases which may be in cubic configuration (also termed B or $P_c$) or tetragonal configuration (also termed $P_1$) but is not limited to these forms. The structure and characteristics of the zeolite P class are given in "Zeolite Molecular Sieves" of Donald W. Breck (published 1974 and 1984 by Robert E. Krieger of Florida USA). The zeolite P class has the typical oxide formula:

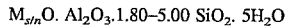

$M_{s/n}O \cdot Al_2O_3 \cdot 1.80–5.00\ SiO_2 \cdot 5H_2O$

The present invention provides a process for preparing crystalline P-zeolites having Si:Al ratios from 0.9 to 1.33, preferably ratios of 1.15:1 and below and more preferably 1.07:1 and below.

M is an n-valent cation which for this invention is an alkali-metal, that is lithium, potassium, sodium, caesium or rubidium with sodium and potassium being preferred and sodium being the cation normally used in commercial processes.

Thus sodium may be present as the major cation with another alkali metal present in a minor proportion to provide a specific benefit.

The process of the present invention allows the production of P-zeolite with the above defined ratios at economic yield. During the formation of the crystalline zeolite the reacted medium passes through a gel stage.

TESTS AND METHODS i) Crystallinity

The crystallinity measurements were made in the following manner.

Firstly x-ray diffraction patterns were measured for a pure phase reference sample of similar chemical composition and each experimental sample. The total area of the five major peaks in each sample was then compared with that of the reference sample. The reference sample was obtained according to Example 11 of EP-A-565364. The diffraction patterns were measured on a Siemens D5000 diffractometer using CuKalpha radiation. The samples were finely ground and compacted in a backfilling sample holder. Data was collected in the region 9 to 37 degrees two Theta using a step side of 0.05 degrees and counting for 6 seconds at each step. The x-ray tube voltage was set at 40 kV and the current at 40 mA.

The recorded diffraction patterns were analyzed using the "Profile Fitting" routine within the Siemens Diffrac-AT v3.0 computer software package. Firstly the scattered x-ray intensity is removed with manual adjustment of the "Curvature" option. Care is taken to minimise the curvature so as not to remove real peak area. Then the peaks to be measured are identified, these have the approximate d-spacings: 7.1; 5.0; 4.1; 3.2 and 2.7 Angstroms. They are fitted to the most suitable mathematical function within the data handling program. In this case the Voigt function was found to best fit all five of the peaks of the reference sample. The same function was used to fit the peaks of the experimental samples. With each peak described mathematically the analysis package is able to calculate the area of each peak. If R is the total area of the peaks of the reference sample, and S the total area of the peaks of the experimental sample then the degree of crystallinity can be expressed as follows:

Degree of Crystallinity=$S/R \times 100$

General description of the invention

It is a first object of the present invention to provide a process for manufacturing an alkali metal aluminosilicate of zeolite P type having the oxide formula

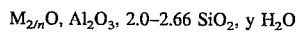

$M_{2/n}O,\ Al_2O_3,\ 2.0–2.66\ SiO_2,\ y\ H_2O$ y being the water content, wherein sodium silicate, sodium aluminate and sodium hydroxide are mixed together in a first reacting zone, to produce a mixture having the general formula:

$2.5–7.5\ Na_2O,\ 2.0–3.0\ SiO_2,\ Al_2O_3,\ 80–250\ H_2O$ the mixture reacting to form amorphous aluminosilicate and supersaturated mother liquor and being then transferred from this first reacting zone to a second reacting zone, the transferred mixture having a degree of crystallinity below 30%, preferably 20%, the mixture being afterwards allowed to fully convert into P type zeolite, the resulting product being eventually filtered, washed and dried.

By reacting zone it is understood a reacting vessel or a zone of a plug flow reactor as for example marketed by Power Fluidics, AEA Technology, Risley, Warrington, U.K..

By doing so, nuclei of P zeolite are produced in the first reacting zone whereas they are only allowed to grow in a second reacting zone therefore keeping a high concentration of aluminosilicate in solution in the first reacting zone which is not consumed by crystal growth which only substantially occurs in subsequent reacting zones.

It is a second object of the present invention to provide a process as above described wherein sodium silicate, sodium aluminate and sodium hydroxide are added continuously in a first reacting zone, the mixture being continuously removed from this first reacting zone and transferred into a second reacting zone, the residence time of the mixture in the first reacting zone being such that the transferred mixture has a degree of crystallinity below 30%, preferably 20%, the mixture being afterwards allowed to fully convert into P type zeolite, the resulting product being eventually filtered, washed and dried.

By doing so, it is possible to continuously produced P zeolite. The mixture transferred from the first reacting zone into the second reacting zone can obviously be allowed to fully convert into P zeolite in this second zone, it is also possible to transfer the mixture from the second reacting zone, when the conversion of amorphous aluminosilicate into crystalline P zeolite is still incomplete, into another reacting zone, or a series of reacting zones, wherein a complete conversion will be achieved.

The key point is to transfer the mixture from the first reacting zone into another one while the degree of crystallinity is still below 30% preferably below 20%.

SPECIFIC DESCRIPTION OF THE INVENTION

The present invention will be further described in the following examples.

Example 1

Two experiments were carried out using two different residence times in the reactor, one of 60 minutes, the other of 90 minutes.

Two solutions were prepared as follows:

Solution A:
  648 g alkaline sodium silicate (approximately 28% wt. $SiO_2$, 14% wt. $Na_2O$) was diluted with caustic soda solution prepared by dissolving 91 g NaOH pellets in 1264 g deionised water.

Solution B:
  800 g sodium aluminate (approximately 20% wt. $Al_2O_3$, 20% wt. $Na_2O$) is diluted with caustic soda solution prepared as for solution A.

A zeolite (232 g, 88% dry solids content) obtained according to Example 11 of EP-A-565,364 was diluted in caustic soda solution (1468 g of a 10% wt. solution of NaOH).

The resulting slurry was heated to 90° C. and stirred at 500 rpm (700 rpm in the case of a residence time of 90 minutes) with a four pitched blade 40 mm diameter in a baffled 2.5 liter jacketed glass vessel supplied with hot silicone oil. Dilute sodium aluminate (Solution B) and sodium silicate (Solution A) solutions were added via two metering pumps with identical flow rates of 9.4 g/minute (14.1 g/minute in the case of a residence time of 60 minutes). Slurry was pumped out of the reactor at a rate of 18.8 g/minute (28.3 g/minute in the case of a residence time of 60 minutes).

This arrangement maintained a reaction mixture having the following composition:

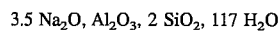

3.5 $Na_2O$, $Al_2O_3$, 2 $SiO_2$, 117 $H_2O$

The system was run in continuous mode for 390 minutes in the case of a residence time of 90 minutes and for 180 minutes in the case of a residence time of 60 minutes.

X-ray diffraction of samples taken from the outlet of the vessel showed that, in both cases, for only two residence times was operation giving pure zeolite P. Beyond these times amorphous material was formed in increasing proportion.

The results of the experiment with a 90 minutes residence time are summarized in the following table 1.

TABLE 1

| Time (minutes) | Crystallinity (%) |
|---|---|
| 45 | 100 |
| 90 | 100 |
| 225 | 100 |

TABLE 1-continued

| Time (minutes) | Crystallinity (%) |
|---|---|
| 270 | 60 |
| 345 | 40 |
| 390 | 10 |

Example 2

In this example, the process is operated in two vessels, a first one to be fed with raw material solutions and a second one fed only with the outflow from the first one.

Two solutions were prepared as follows:

Solution A:
  824 g alkaline sodium silicate (approximately 28% wt. $SiO_2$, 14% wt. $Na_2O$) was diluted with 1200 g deionised water.

Solution B:
  668 g sodium aluminate (approximately 20% wt. $Al_2O_3$, 20% wt. $Na_2O$) was diluted with caustic soda solution prepared by dissolving 81.6 g NaOH pellets in 1052 g deionised water.

To Solution B (450 g) (stirred at 90° C. with a 6 pitched blade 40 mm diameter stainless steel turbine at 100 rpm in a 1.5 liter jacketed vessel maintained at 90° C.) Solution A (462 g) at room temperature was added over a 20 minute period giving a reaction mixture having the following composition in terms of the oxides:

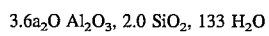

3.6$a_2O$ $Al_2O_3$, 2.0 $SiO_2$, 133 $H_2O$

The mixture was heated and stirred for one hour then transferred to a second vessel comprising a round bottom 1 liter flanged glass flask fitted with a lid and stirred with an agitator comprising one pitched blade 100 mm stainless steel impeller. This vessel was mounted in the heated oil reservoir of a temperature controller and so was kept at a temperature of 97° C.

As this transfer was taking place, fresh aluminate and silicate solutions were added simultaneously to the first vessel at a rate of 7.5 g/minute (aluminate) and 7.7 g/minute (silicate), the rate of transfer from the first vessel to the second vessel was 15.2 g/minute. When both vessels were full, the pumps were switched off and system stirred and heated for a further two hours before switching all the pumps on again and running continuously foe 4 hours (4 residence times in each vessel).

X-ray diffraction of samples taken from the transfer pipeline (between the first and the second vessel) and from the outlet from the second vessel showed that the first vessel produced a mostly amorphous product whilst the second vessel produced crystalline zeolite P. This system would appear to be stable for at least 4 residence times when washout of the zeolite present originally from the batch stage of the operation could be expected to be virtually complete in 3 residence times.

The results are summarized in the following table 2 wherein are indicated, the crystallinity of the solid product contained in the transfered slurry and the crystallinity of the solid product at the outlet of the second vessel.

TABLE 2

| Time (minutes) | Cystallinity (%) of the transferred slurry | Crystallinity (%) at the outlet of the second vessel |
| --- | --- | --- |
| 60 | 10 | 100 |
| 120 | 10 | 100 |
| 180 | 5 | 100 |
| 250 | 10 | 100 |

It is possible to compare the figures in table 2 with the theoritical figures which could be expected using to perfectly stirred tank reactors containing originally pure zeolite P at time zero, assuming that the continuous addition of solutions A and B does not produce any nucleation and that preexisting zeolite P does not grow in size. Those theoritical figures are summarized in table 3.

TABLE 3

| Time (minutes) | Cystallinity (%) of the transferred slurry | Crystallinity (%) at the outlet of the second vessel |
| --- | --- | --- |
| 60 | 40 | 75 |
| 120 | 15 | 40 |
| 180 | 5 | 20 |
| 250 | 2 | 10 |

Comparing table 2 and table 3 it is clear that the continuous production of pure zeolite P can't be attributed to the mere washing out of the two vessels.

Example 3

The experiment of Example 2 was repeated with the following modifications. The temperature in the first vessel was 97° C. and the temperature in the second vessel was 90° C. The mass hold up in the second vessel was 1.5 the original scale in order to increase the residence time in this vessel to 90 minutes. Furthermore, the agitation conditions were improved with a second propeller in the first vessel and this was turned at approximately 700 rpm whereas the second vessel was agitated using the stirrer described previously and tuned at 800 rpm.

Batch mixtures were made in each vessel, as in Example 2, and continuous operation begun after a period of 4 hours and was maintained for 4.5 hours (3 residence times in the second vessel and 4.5 residence times in the first vessel).

X-ray diffraction results for samples taken from the transfer line (between the first and the second vessel) and the outlet from the second vessel at different times show a washout of the first vessel in line with model equations for residence time distributions, and hence a largely amorphous product. The product of the second vessel was crystalline type P zeolite for the entire period.

The results are summarized in the following table 4 wherein are indicated, the crystallinity of the solid product contained in the transfered slurry and the crystallinity of the solid product at the outlet of the second vessel.

TABLE 4

| Time (minutes) | Cystallinity (%) of the transferred slurry | Crystallinity (%) at the outlet of the second vessel |
| --- | --- | --- |
| 0 | 100 | 100 |
| 60 | Not measured | 100 |
| 120 | Not measured | 100 |
| 180 | Not measured | 100 |
| 210 | 10 | 100 |
| 280 | 10 | 100 |
| 360 | 5 | 100 |

We claim:

1. Process for manufacturing an alkali metal aluminosilicate of zeolite P type having the oxide formula $$M_{2/n}O, Al_2O_3, 2.0\text{–}2.66\ SiO_2,\ y\ H_2O$$

y being the water content, wherein sodium silicate solution, sodium aluminate solution and sodium hydroxide are mixed together in a first reacting zone, to produce a mixture having the general formula:

$$2.5\text{–}7.5\ Na_2O,\ 2.0\text{–}3.0\ SiO_2,\ Al_2O_3,\ 80\text{–}250\ H_2O$$

the mixture reacting to form amorphous aluminosilicate and supersaturated mother liquor and being then transferred from this first reacting zone to a second reacting zone, the transferred mixture having a degree of crystallinity below 30%, the mixture being afterwards allowed to fully convert into P type zeolite, the resulting product being eventually filtered, washed and dried.

2. The process according to claim 1, wherein the transferred mixture has a degree of crystallinity below 20%.

3. Process according to claim 1 wherein sodium silicate, sodium aluminate and sodium hydroxide are added continuously in a first reacting zone, the mixture being continuously removed from this first reacting zone and transferred into a second reacting zone, the residence time of the mixture in the first reacting zone being such that the transferred mixture has a degree of crystallinity below 30%, the mixture being afterwards allowed to fully convert into P type zeolite, the resulting product being eventually filtered, washed and dried.

4. The process according to claim 3, wherein the transferred mixture has a degree of crystallinity below 20%.

* * * * *